United States Patent
Donahue (10) Patent No.: US 10,571,623 B2
(45) Date of Patent: Feb. 25, 2020

(54) MULTICOLOR TRANSPARENT DISPLAYS

(71) Applicant: GloTech Inc., Boston, MA (US)

(72) Inventor: Kevin Donahue, Harvard, MA (US)

(73) Assignee: GloTech, Inc., Boston, MA (US)

( * ) Notice: Subject to any disclaimer, the term of this patent is extended or adjusted under 35 U.S.C. 154(b) by 302 days.

(21) Appl. No.: 15/375,060

(22) Filed: Dec. 9, 2016

(65) Prior Publication Data

US 2017/0168211 A1  Jun. 15, 2017

Related U.S. Application Data (60) Provisional application No. 62/265,091, filed on Dec. 9, 2015, provisional application No. 62/265,089, filed on Dec. 9, 2015.

(51) Int. Cl.
*G02B 6/00* (2006.01)
*F21V 8/00* (2006.01)

(52) U.S. Cl.
CPC ........... *G02B 6/008* (2013.01); *G02B 6/0018* (2013.01); *G02B 6/0051* (2013.01); *G02B 6/0068* (2013.01)

(58) Field of Classification Search
CPC ......... G02F 1/133615; G02F 1/133606; G02F 2001/133616; G02B 6/0018; G02B 6/0051; G02B 6/0075; G02B 6/0081
USPC .......................................... 40/542, 543, 546
See application file for complete search history.

(56) References Cited

U.S. PATENT DOCUMENTS

| | | | |
|---|---|---|---|
| 5,546,687 A * | 8/1996 | Iorfida | A47G 1/0622 362/128 |
| 6,584,714 B1 | 7/2003 | Wehrmann et al. | |
| 7,513,674 B1 | 4/2009 | Donahue | |
| 7,681,347 B1 * | 3/2010 | Welker | G02B 6/0016 40/546 |
| 8,100,575 B2 | 1/2012 | Donahue | |
| 9,933,684 B2 * | 4/2018 | Brown | G02F 1/29 |
| 2003/0046842 A1 * | 3/2003 | Maas | G02B 6/0036 40/546 |
| 2003/0123245 A1 * | 7/2003 | Parker | A61M 21/02 362/602 |

(Continued)

FOREIGN PATENT DOCUMENTS

WO  WO-2014/145410 A1  9/2014
WO  WO-2014/210349 A1  12/2014

OTHER PUBLICATIONS

International Search Report and Written Opinion for PCT/US2016/066032.

*Primary Examiner* — Julie A Bannan
(74) *Attorney, Agent, or Firm* — Foley & Lardner LLP (57) ABSTRACT

The present disclosure is directed to multicolored transparent displays. In some aspects, the systems and methods disclosed herein make use of light guides that operate on the principle of total internal reflection. Light can be extracted from the light guide by altering the interface at the surface of the light guide. A display can include a light guide having a plurality of pixels on a surface of the light guide. The display can also include a light source configured to introduce light into an edge of the light guide at a first angle greater than a critical angle for total internal reflection within the light guide, such that a portion of the light is extracted from the light guide by the plurality of pixels and is directed out of the viewing side of the display.

10 Claims, 4 Drawing Sheets

(56) References Cited

U.S. PATENT DOCUMENTS

| | | | |
|---|---|---|---|
| 2004/0022515 A1* | 2/2004 | Sugiura | G02B 6/0038 385/146 |
| 2009/0180282 A1* | 7/2009 | Aylward | G02B 6/0021 362/245 |
| 2010/0061115 A1 | 3/2010 | Donahue | |
| 2011/0047840 A1* | 3/2011 | Ou | G02B 6/006 40/546 |
| 2012/0163021 A1* | 6/2012 | Bohn | G02F 1/133615 362/608 |
| 2013/0314944 A1* | 11/2013 | McCollum | F21V 5/00 362/608 |
| 2014/0286048 A1* | 9/2014 | Riello | G09F 13/18 362/608 |
| 2015/0219834 A1 | 8/2015 | Nichol et al. | |
| 2015/0316227 A1* | 11/2015 | Sahlin | B60Q 1/0058 362/511 |
| 2016/0349433 A1* | 12/2016 | Donahue | E06B 7/28 |
| 2018/0292592 A1* | 10/2018 | Danziger | G02B 6/34 |

* cited by examiner

MULTICOLOR TRANSPARENT DISPLAYS

RELATED APPLICATIONS

This application claims priority to U.S. Provisional Patent App. No. 62/265,089, filed on Dec. 9, 2015 and entitled "Transparent Eyewear Displays," and to U.S. Provisional Patent App. No. 62/265,091, filed on Dec. 9, 2015 and entitled "Multicolor One-Way Illuminated Display," each of which is incorporated by reference herein in its entirety.

BACKGROUND OF THE DISCLOSURE

Electronic displays can be used for a variety of purposes, including signage for businesses. For example, an electronic display can be used a substitute for a neon-based sign. Electronic displays may consume less power and may display higher resolution images than similarly sized neon displays. Some electronic displays may produce color images. For example, color imagery, that presents all colors of visible electromagnetic radiation, i.e., light, can be produced by small, barely visible or invisible, adjacent or overlapped pixels that can generate red, green, or blue illumination.

SUMMARY OF THE DISCLOSURE

The present disclosure provides systems and methods for multicolor transparent displays. A transparent display can produce one-way see-through illumination (also referred as transparent illumination) using pixels that feature a light-emitting surface and an opposing light-reflecting surface. Examples of such devices are provided, for example, in U.S. Pat. Nos. 7,513,674 and 8,100,575, the contents of which are incorporated herein in their entirety. This disclosure describes one-way see-through (i.e., transparent) displays that can feature multiple color pixels. In some implementations, such display can be generated by UV-activated compounds, such as phosphorescent and fluorescent compounds.

Low-cost edge-illuminated light guides can be utilized to produce colored pixels by mixing light from overlapping aligned areas of light emission. Specifically, layers of light guides, each of which emits light via frustrated total internal reflection, can be incorporated into a multicolor transparent display. This light can be combined to form the surface color of the display, (i.e. the color of each visible pixel). Further, on the rear surface of the lowest layer in the stack of light guides, a reflective layer such as aluminum can be applied to achieve transparency when viewed through the rear surface of the display. Also provided in this disclosure are techniques involving the use of edge-illuminated ultraviolet electromagnetic illumination to produce color changes or colored illumination by the application of photochromic or photoluminescent compound on the surface of one or more light guides, within a stack of light guides that comprise the ultimate illuminated display. In addition, such displays may be incorporated into other devices, such as the lenses of eyeglasses.

One aspect of the disclosure is directed to a display. The display can include a first light guide proximate to a viewing side of the display. The first light guide can include a first plurality of light-diffusing pixels on a surface of the first light guide. The first plurality of pixels can include at least a first pixel. The display can include a second light guide positioned within a plane parallel to the first light guide and positioned nearer to a non-viewing side of the display than the first light guide. The second light guide can include a second plurality of light-diffusing pixels on a surface of the second light guide. The second plurality of pixels can include at least a second pixel. The display can include a light source configured to introduce light having a first color into an edge of the first light guide at a first angle greater than a first critical angle for total internal reflection within the first light guide, such that a portion of the light having the first color is extracted from the first light guide by the first plurality of pixels and is directed out of the viewing side of the display. The light source also can be configured to introduce light having a second color into an edge of the second light guide at a second angle greater than a second critical angle for total internal reflection within the second light guide, such that a portion of the light having the second color is extracted from the second light guide by the second plurality of pixels and is directed out of the viewing side of the display, wherein the portion of the light having the first color and the portion of the light having the second color that are directed out of the viewing side of the display form an image.

In some implementations, at least a portion of the first pixel overlaps at least a portion of the second pixel in a direction perpendicular to the surfaces of the first light guide and the second light guide. In some implementations, the first pixel can have a first shape and the second pixel can have a second shape, different from the first shape. In some implementations, the first pixel can have a first size selected based on a predetermined amount of the light having the first color to be extracted from the first light guide. In some implementations, the second pixel can have a second size, different from the first size.

In some implementations, the first pixel can include a light-diffusing compound. In some implementations, a concentration of the light-diffusing compound within the first pixel can be selected based on a predetermined amount of the light having the first color to be extracted from the first light guide. In some implementations, a reflective compound can be positioned on a surface of each pixel of the second plurality of pixels farthest from the viewing side of the display. The reflective compound can be configured to limit an amount of light directed out of the side of the display farthest from the viewing side of the display.

In some implementations, the display can include a third light guide positioned between the first light guide and the second light guide. The third light guide can include a third plurality of light-diffusing pixels on a surface of the third light guide. The third plurality of pixels can include at least a third pixel. In some implementations, at least a portion of the first pixel can overlap at least a first portion of the second pixel in a direction perpendicular to the surfaces of the first light guide and the second light guide. At least a portion of the third pixel can overlap at least a second portion of the second pixel in a direction perpendicular to the surfaces of the first light guide. The second light guide, and the third light guide.

In some implementations, the light source can be further configured to introduce light having a third color into an edge of the third light guide at a third angle greater than a third critical angle for total internal reflection within the third light guide, such that a portion of the light having the third color is extracted from the third light guide by the third pixel and is directed out of the viewing side of the display. In some implementations, the light having the first color can be red light, the light having the second color can be green light, and the light having the third color can be blue light.

In some implementations, the display can include a power source coupled to the light source and a controller coupled to the power source and to the light source. The controller can be configured to control an output of the light source. In some implementations, the controller can be further configured to control the light source such that the image formed by the portion of the light having the first color and the portion of the light having the second color that are directed out of the viewing side of the display is an animated image. In some implementations, the power source can be a solar panel.

Another aspect of this disclosure is directed to a display. The display can include a light guide having a plurality of pixels on a surface of the light guide. The plurality of pixels can include at least a first pixel. The display can also include a light source configured to introduce light into an edge of the light guide at a first angle greater than a critical angle for total internal reflection within the light guide, such that a portion of the light is extracted from the light guide by the plurality of pixels and is directed out of the viewing side of the display.

In some implementations, the light source can be configured to introduce ultraviolet (UV) light into light guide. In some implementations, the first pixel can include at least one of a light-emitting compound or a color altering compound. In some implementations, the first pixel can include at least one of a fluorescent compound or a phosphorescent compound. In some implementations, the display can include a reflective compound positioned on a surface of each pixel of the plurality of pixels farthest from the viewing side of the display. The reflective compound can be configured to limit an amount of light directed out of the side of the display farthest from the viewing side of the display.

Another aspect of this disclosure is directed to a display. The display can include a first light guide proximate to a viewing side of the display. The first light guide can include a first plurality of pixels arranged in a first halftone pattern on a surface of the first light guide. The display can include a second light guide positioned within a plane parallel to the first light guide. The second light guide can include a second plurality of light-diffusing pixels arranged in a second halftone pattern on a surface of the second light guide. The display also can include a light source configured to introduce light into each of the first light guide and the second light guide.

In some implementations, the first plurality of pixels can include at least a first pixel and the second plurality of pixels can include at least a second pixel. At least a portion of the first pixel can overlap at least a portion of the second pixel in a direction perpendicular to the surfaces of the first light guide and the second light guide.

In some implementations, the second light guide can be positioned farther from a viewing side of the display than the first light guide. The display can further include a reflective compound positioned on a surface of each pixel of the second plurality of pixels farthest from the viewing side of the display. The reflective compound can be configured to limit an amount of light directed out of the side of the display farthest from the viewing side of the display.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The present disclosure provides systems and methods for multicolor transparent displays and other applications, such as eyewear, that may use the total internal reflection techniques and systems described herein. A transparent display can produce one-way see-through illumination (also referred as transparent illumination) using pixels that feature a light-emitting surface and an opposing light-reflecting surface. This disclosure describes one-way see-through (i.e, transparent) displays that can feature multiple color pixels. In some implementations, such display can be generated by UV-activated compounds, such as phosphorescent and fluorescent compounds.

Low-cost edge-illuminated light guides can be utilized to produce colored pixels by mixing light from overlapping aligned areas of light emission. Specifically, layers of light guides, each of which emits light via frustrated total internal reflection, can be incorporated into a multicolor transparent display. This light can be combined to form the surface color of the display, (i.e. the color of each visible pixel). Further, on the rear surface of the lowest layer in the stack of light guides, a reflective layer such as aluminum can be applied to achieve transparency when viewed through the rear surface of the display. Also provided in this disclosure are techniques involving the use of edge-illuminated ultraviolet electromagnetic illumination to produce color changes or colored illumination by the application of photochromic or photoluminescent compound on the surface of one or more light guides, within a stack of light guides that comprise the ultimate illuminated display. In addition, such displays may be incorporated into other devices, such as the lenses of eyeglasses.

Figure 1:
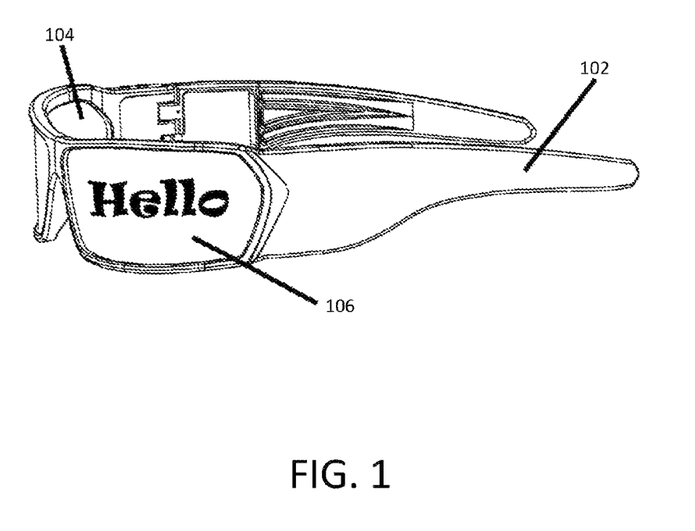
FIG. 1 is a perspective view of a pair of eyeglasses including transparent illuminated lenses, according to one implementation.
Figure 2:
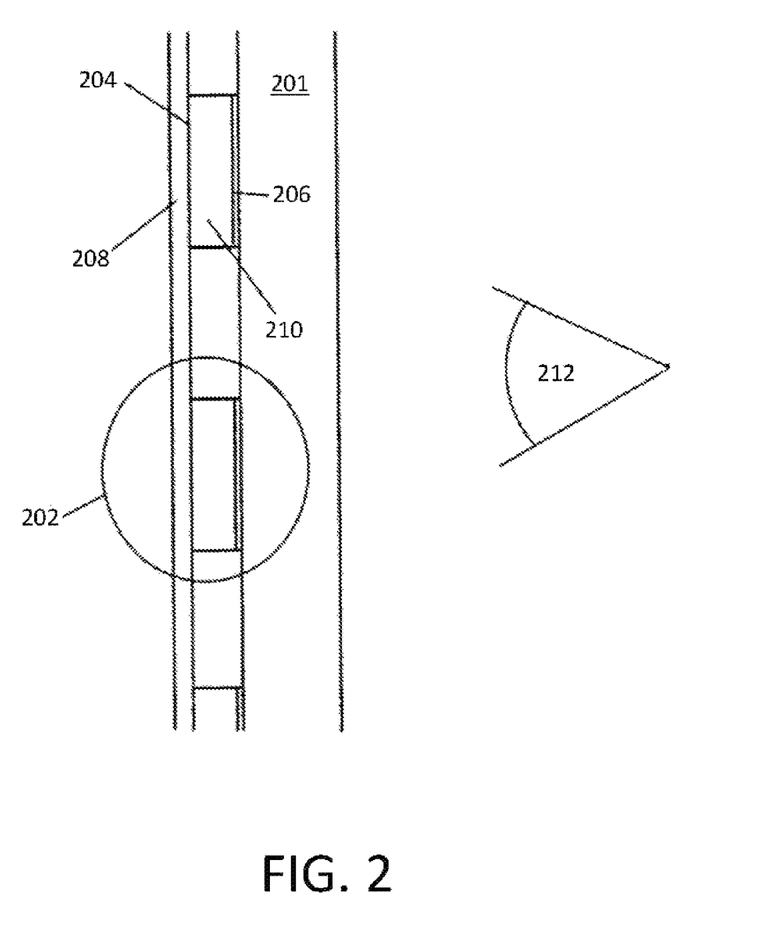
FIG. 2 is a cross-sectional view of a lens of the eyeglasses shown in FIG. 1, according to one implementation.

FIG. 1 is a perspective view of a pair of eyeglasses 102 including transparent illuminated lenses, according to one implementation. FIG. 2 is a cross-sectional view of a lens of the eyeglasses 102 shown in FIG. 1, according to one implementation. FIGS. 1 and 2 are described together below.

The eyeglasses 102 include two lenses, each of which includes a rear surface 104 and a front surface 106. As shown, the front surface of the lenses can be configured to display a message or other form of imagery, which may include textual, numerical, or graphical information. In some implementations, the imagery displayed on each lens may include two or more colors. The imagery on each lens is visible to a viewer of the eyeglasses 102 from the front side (i.e., looking toward the front surface 106). However, from the perspective of the wearer of the eyeglasses 102 (i.e., looking toward the rear surface 104 of each lens), the lenses may appear to be transparent even while an observer looking at the front surface 106 of each lens perceives imagery displayed on the lenses. As such, the rear surface 104 of each lens may also be referred to as a transparent surface, and the front surface 106 of each lens may be referred to as a display surface.

Referring to FIGS. 1 and 2, each lens can be composed of an optical material 201 with an exterior surface composed of a pixel array that forms the transparent surface 104 and the display surface 106. In some implementations, the optical material can be glass or an optically clear plastic, such as polycarbonate, acrylic, cyclic olefin copolymer (COC), and polyethylene terephthalate (PETG). Individual pixels, such as the pixel 202 shown in FIG. 2, within the pixel array can have a light emitting surface 204 and a light-reflecting surface 206. In some implementations, the light-reflecting surface 206 of each pixel 202 can be formed from a metal or a metal compound, such as aluminum. A transparent conductive surface 208 is positioned on the front surface 106 of each lens. In some implementations, the light-reflecting surfaces 206 of the pixels 202 may be interconnected to one another by a transparent conductive layer or metallic leads such that electricity can be conducted between the light-reflecting surfaces 206 of the pixels 202. Thus, the transparent conductive surface 208 can act as an anode, and the light reflecting surfaces 206 can act as a cathode.

A light-emitting compound 210 can be positioned within each pixel 202 between the transparent conductive surface 208 and the light reflecting surface 206. The light-emitting compound 210 can be, for example, an organic light-emitting compound such as those found in organic light-emitting diodes (OLEDs). In some implementations, the light-emitting compound 210 can be configured to emit light in response to an applied electrical current or voltage. Thus, when a voltage is applied across the transparent conductive surface 208 and the light reflecting surface 206, the light-emitting compound 210 in each pixel 202 can become illuminated. The light-emitting compound 210 may be identical in each pixel 202, thereby generating a single color display on the front surface 106 of each lens. In some other implementations, the light-emitting compound 210 in each pixel 202 may vary, and some may produce different colors than others, thereby producing a multicolor display on the front surface 106 of each lens.

In some implementations, a power source such as a rechargeable lithium ion battery may supply electrical power to provide such a voltage. Voltage may be delivered uniformly across the entire surface of each lens, thereby producing a static image when voltage is applied. In some other implementations, the eyeglasses 102 may include a controller configured to control the voltage applied to individual pixels 202 or to separate sets of pixels 202. As a result, each lens of the eyeglasses 102 may appear to be an active video display when viewed from the front surface 106. In some implementations, the controller may be implemented as a miniaturized application-specific integrated circuit (ASIC) that may be incorporated directly into the eyeglasses 102. In some implementations, the controller may be or may include a remote controller, such as a personal computing device (e.g., a cellular phone or tablet computing device) carried by the wearer of the eyeglasses 102.

When viewed from the rear surface 104, each lens can be perceived as transparent from the perspective of the wearer 212. For example, the pixels 202 can be arranged in a halftone pattern across each lens, and the lenses may appear transparent when viewed from the rear surface 104 due to the halftone pattern arrangement of the pixels 202 and the small size of the pixels 202, which may be too small in width to be perceived by the eye of the wearer 212 at any distance. The light-reflecting surface 206 of each pixel 202 can be arranged in the halftone pattern, and may be dispersed across the surface of each lens in a density that is insufficient to frustrate transparency when viewed through the rear surface 104. In some implementations, the arrangement of the pixels 202 across each lens can be selected such that the arrangement does not promote a diffraction grating when viewing ambient lighting conditions. It should be noted that the relative sizes of components may not be accurately represented in FIG. 2. For example, in some implementations, the pixels 202 may be much smaller that the eye of the wearer 212. The sizes of components shown in FIG. 2 are for illustrative purposes only.

Figure 3:
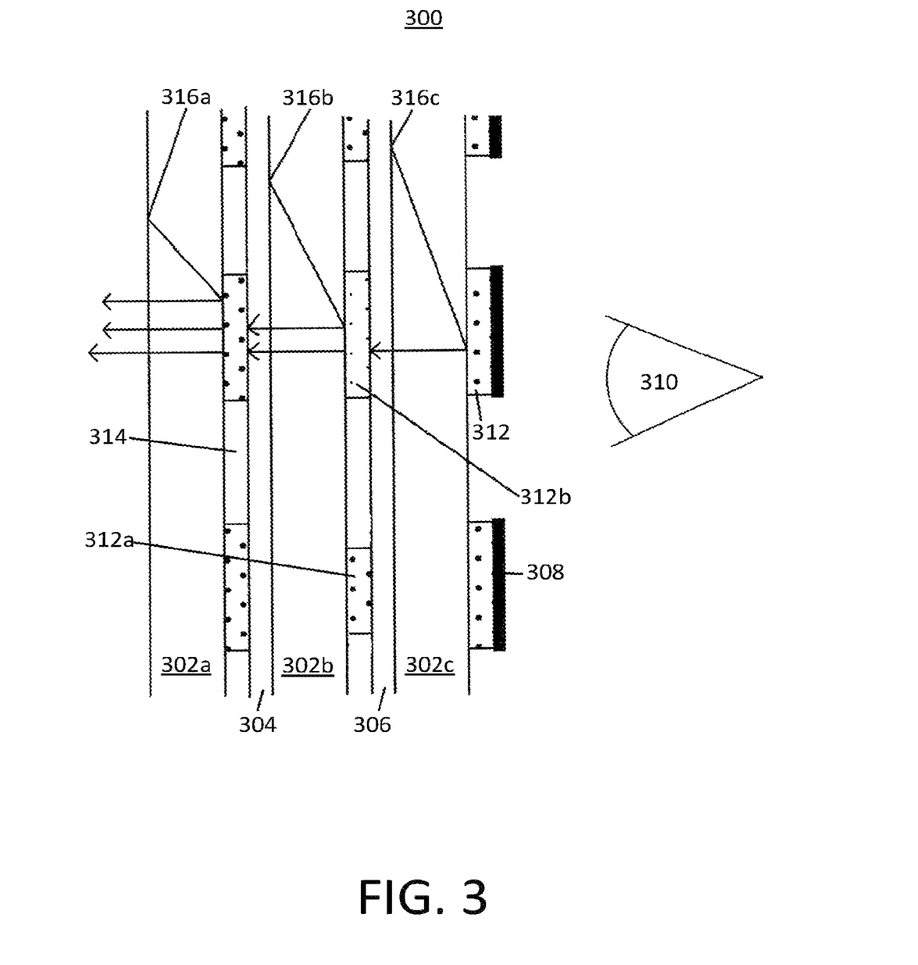
FIG. 3 is a cross-sectional view of an example transparent illuminated display, according to one implementation.

FIG. 3 is a cross-sectional view of an example transparent illuminated display 400, according to one implementation. The display 400 includes three light guides 302a-302c (generally referred to as light guides 302). The light guides 302 are arranged in a parallel stack. Each light guide 302 receives a respective one of the light rays 316a, 316b, and 316c (generally referred to as light rays 316). In some implementations, the light rays 316 may be introduced into the edges of their respective light guides 302 by one or more light sources, such as a lamp or an array of LEDs.

The light guides 302 can be configured to achieve total internal reflection of their respective light rays 316. Total internal reflection is commonly deployed in optical fibers to transmit light down the fiber with little loss through the surrounding surface of the fiber. The process starts when the light guides 302 are illuminated at their edges by the light rays 316, and the light rays 316 are trapped within their respective light guides 302 by total internal reflection as a result of a difference between the index of refraction of the light guides 302 and the index of refraction of the surrounding media 304 and 306. In some implementations, the surrounding media 304 and 306 may be air. In some other implementations, the surrounding media 304 and 306 may be an adhesive or lamination layer to which the adjacent light guides 302 are fixed. The light guides 302 can be formed, for example, from any type of optically clear material, such as polycarbonate, acrylic, co-polyester, glass, or polyethylene terephthalate (PETG). In some implementations, various materials suitable for use as the light guides 302 may have different indices of refraction, and the material to be used may be selected based on its particular index of refraction as well as the index of refraction of the surrounding media 304 and 306. For example, polycarbonate may have an index of refraction of about 1.56.

For effective illumination of the light guides 302, it can be helpful for the light rays 316 to be injected into the light guides 302 at angles of incidence close to the critical angles of the interface between the light guides 302 and the surrounding media 304 and 306. Therefore, in some implementations, a light source may be inserted into or otherwise coupled to the light guides 302 at a predetermined angle that is close to the critical angle for each light guide 302. In some other implementations, the light source can be built-in to the light guides 302 and can be configured to emit the light rays 316 at a predetermined angle that is close to the critical angle for each light guide 302. For example, a glass-air interface can have critical angle of about 45 degrees, while a plastic-air interface can have a critical angle of about 42 degrees. Light rays 316 travelling at an angle within the light guides 302 that is greater than the critical angle with respect to an axis normal to the interface will be trapped (i.e. reflected internally). It can be advantageous to inject the light into the light guides 302 at an angle close to the critical angle. For example if the critical angle is 45 degrees, an angle in the range of about 45 degrees to about 60 degrees can provide sufficient surface interactions across the light guides 302 without being refracted.

A plurality of pixels, such as the pixel 312, are provided on each of the light guides 302. For illustrative purposes, not every pixel is labeled with a reference numeral in FIG. 3. The pixels 312 can be light-diffusing regions which are designed to frustrate total internal reflection within their respective light guides 302. Thus, while radiation (e.g., light) incident on surfaces of the light guides 302 is typically reflected back into the light guides 302 by total internal reflection, radiation incident on the pixels 312 does not experience such reflection. Instead, some portion of the radiation incident on the pixels 312 is allowed to escape from the light guides 302. In some implementations, the pixels 312 can be formed by nanoimprinting or other nanoassembly techniques. For example, in some implementations, the pixels 312 can be formed from a light-diffusing material, such as titanium dioxide or titania. In some other implementations, the pixels may be formed by chemical or mechanical etching or imprinting portions of the light guides 302 at angles selected to frustrate total internal reflection.

The light rays 316 trapped by total internal reflection are reflected or refracted from the surface of the pixels 312 to generate an illuminated surface image on a viewing side of the display 300 (i.e., the left-hand side shown in FIG. 3). As shown, the pixels 312 are aligned in rows across the light guides 312 in a direction perpendicular to the surfaces of the light guides 302. Thus, for each perpendicular row, light from each of the pixels 312 in that row is combined to produce the corresponding image pixel. In some implementations, each of the light rays 316 may be a different color. For example, a first one of the light rays 316 may be red, a second one of the light rays 316 may be green, and a third one of the light rays 316 may be blue. As a result, various colors for the combined image pixel can be achieved, for example by varying the brightness of the respective light rays 316.

In some implementations, the geometry of a specific pixel 312 can be altered to produce a light combination that generates a specific surface color. For example, in FIG. 3, a pixel 312a having a surface area smaller than that of the remaining pixels 312 is shown. The smaller size of the pixel 312 can limit the contribution of the light extracted from its underlying light guide 302b, thereby altering the color of the corresponding image pixel on the surface of the display 300. In some implementations, a similar effect can also be generated by altering the concentration of the light-diffusing compound within each pixel. In FIG. 3, the density and size of the black dots shown in each pixel 312 can represent the concentration of a light-diffusing compound included within each pixel 312. For example, the pixel labeled 312 has a lower concentration of light-diffusing compound, relative to the concentration of the light-diffusing compound included in the other pixels 312, as shown in FIG. 3. The display 300 also includes a reflective compound 308, such as aluminum, positioned on the rear surface of the rearmost light guide layer 302c (i.e., the light guide nearest to the observer 310) to prevent light emission from the back surface of the display. As a result, perception of the imagery on the front surface of the display 300 by the human observer 310 witnessing from the back surface of the display 300 is limited. In some implementations, the observer 310 may perceive the display 300 as transparent when viewing from the rear surface as shown in FIG. 3.

It should be understood that, in some implementations, the display 300 may include additional or different layers than those shown in FIG. 3. For example, in some implementations, the display 300 may include an additional transparent layer positioned on one or both of the front and rear surfaces of the display 300. Such layers may provide structural support and protection for the light guides 302. In some implementations, exterior and/or interior surfaces of such layers may be coated with an anti-reflection coating to limit retro reflection. In addition, the surfaces of the light guides 302 also may include anti-reflection coatings to limit retro reflection.

In some implementations, a power source such as a rechargeable lithium ion battery may supply electrical power to the light source that generates the light rays 316. In some implementations, the display 300 may also include a controller configured to control the light source. For example, the controller can be configured to sequentially turn on and off the light source for each light guide 302 independently. As a result, the colors displayed on the front surface of the display 300 may appear to change over time when viewed from the front surface 106. In addition, the display may appear to blink or to provide moving or animated images by sequentially activating the light source for each light guide 302 independently. In some implementations, the controller may be implemented as a miniaturized ASIC that may be incorporated directly into the eyeglasses 102. In some implementations, the power source for the controller may be (or may be coupled to) a solar panel or other rechargeable source of energy.

Figure 4:
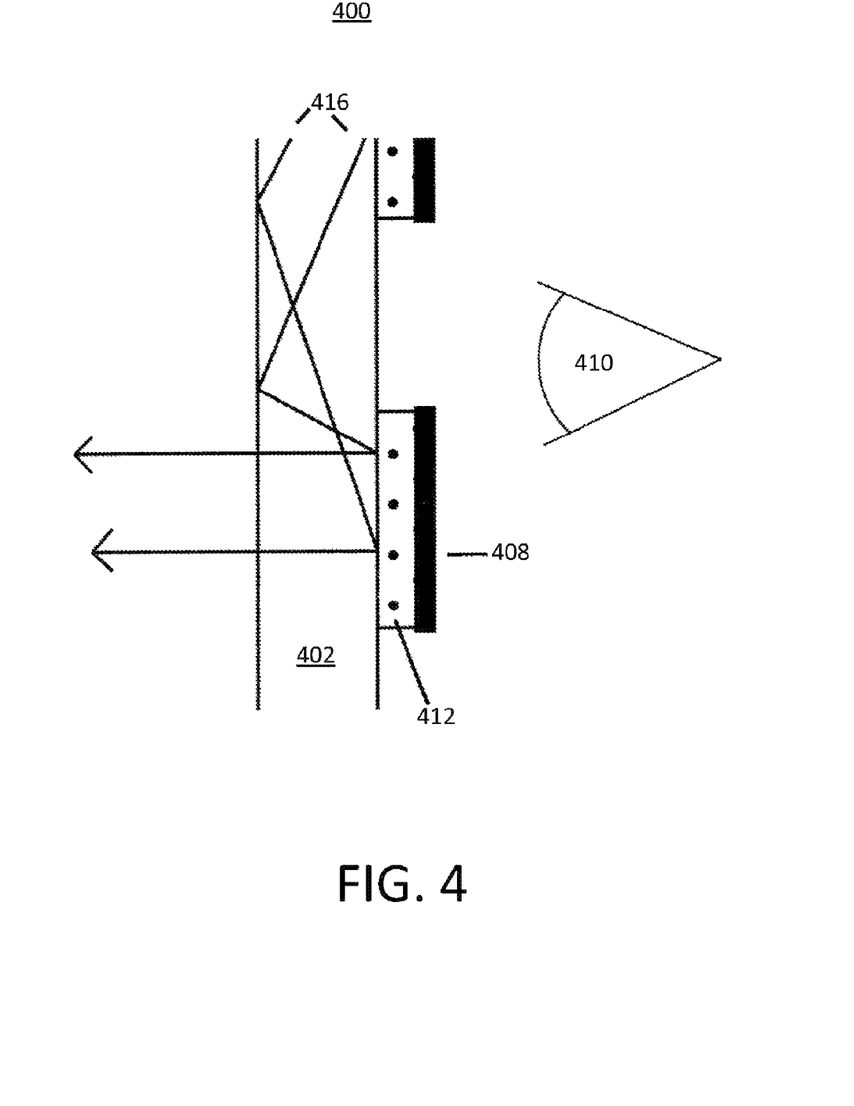
FIG. 4 is a cross-sectional view of an example transparent illuminated display, according to one implementation.

FIG. 4 is a cross-sectional view of an example transparent illuminated display 400, according to one implementation. The display 400 includes a light guide 402 having an array of pixels 412. An observer 410 is shown as viewing the display 400 from a rear side of the display 400. Thus, a front side (i.e., a display side) of the display 400 is positioned on the left-hand side of FIG. 4.

Ultraviolet light rays 416 are introduced into the light guide 402 and are trapped within the light guide 402 by total internal reflection, similar to the principle of operation described above in connection with FIG. 3. The light rays 416 are then frustrated by the pixels 412. However, unlike the pixels 312 shown in FIG. 3, the pixels 412 may include light-emitting compounds, such as fluorescent or phosphorescent compounds. In some implementations, the pixels 412 may include color-altering compounds, such as photochromic compounds. Similar to the display 300, the display 300 can also include light reflecting areas 408 on each pixel 412 to produce a transparent rear surface on the display 400, such that the observer 410 perceives the display 400 to be transparent when viewing from a rear side of the display 400.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A display, comprising:
    a first light guide proximate to a viewing side of the display, the first light guide comprising a first plurality of light-diffusing pixels on a surface of the first light guide, the first plurality of pixels including at least a first pixel comprising a light-diffusing compound;
    a second light guide positioned within a plane parallel to the first light guide and positioned nearer to a non-viewing side of the display than the first light guide, the second light guide comprising a second plurality of light-diffusing pixels arranged in a pattern on a surface of the second light guide, the second plurality of pixels including at least a second pixel;
    a reflective compound arranged in the pattern of the second plurality of pixels and positioned on a surface of each pixel of the second plurality of pixels farthest from the viewing side of the display, the reflective compound configured to limit an amount of light directed out of the side of the display farthest from the viewing side of the display; and
    a light source configured to:
        introduce light having a first color into an edge of the first light guide at a first angle greater than a first critical angle for total internal reflection within the first light guide, such that a portion of the light having the first color is extracted from the first light guide by the first plurality of pixels and is directed out of the viewing side of the display; and
        introduce light having a second color into an edge of the second light guide at a second angle greater than a second critical angle for total internal reflection within the second light guide, such that a portion of the light having the second color is extracted from the second light guide by the second plurality of pixels and is directed out of the viewing side of the display, wherein the portion of the light having the first color and the portion of the light having the second color that are directed out of the viewing side of the display form an image.

2. The display of claim 1, wherein at least a portion of the first pixel overlaps at least a portion of the second pixel in a direction perpendicular to the surfaces of the first light guide and the second light guide.

3. The display of claim 1, wherein the first pixel has a first size selected based on a predetermined amount of the light having the first color to be extracted from the first light guide.

4. The display of claim 3, wherein the second pixel has a second size, different from the first size.

5. The display of claim 1, wherein a concentration of the light-diffusing compound within the first pixel is selected based on a predetermined amount of the light having the first color to be extracted from the first light guide.

6. The display of claim 1, further comprising a third light guide positioned between the first light guide and the second light guide, the third light guide comprising a third plurality of light-diffusing pixels on a surface of the third light guide, the third plurality of pixels including at least a third pixel.

7. The display of claim 6, wherein at least a portion of the first pixel overlaps at least a first portion of the second pixel in a direction perpendicular to the surfaces of the first light guide and the second light guide, and wherein at least a portion of the third pixel overlaps at least a second portion of the second pixel in a direction perpendicular to the surfaces of the first light guide, the second light guide, and the third light guide.

8. The display of claim 6, wherein the light source is further configured to introduce light having a third color into an edge of the third light guide at a third angle greater than a third critical angle for total internal reflection within the third light guide, such that a portion of the light having the third color is extracted from the third light guide by the third pixel and is directed out of the viewing side of the display.

9. The display of claim 1, further comprising:
    a power source coupled to the light source; and
    a controller coupled to the power source and to the light source, the controller configured to control an output of the light source.

10. The display of claim 9, wherein the controller is further configured to control the light source such that the image formed by the portion of the light having the first color and the portion of the light having the second color that are directed out of the viewing side of the display is an animated image.

* * * * *